United States Patent
Essling

(10) Patent No.: US 10,228,247 B2
(45) Date of Patent: Mar. 12, 2019

(54) LIGHT BEAM RECEIVER FOR RECEIVING UNMODULATED AND MODULATED LIGHT BEAMS

(71) Applicant: ANDROTEC GMBH, Waldfischbach-Burgalben (DE)

(72) Inventor: Mirko Essling, Kellenbach (DE)

(73) Assignee: ANDROTEC GMBH, Waldfischbach-Burgalben (DE)

( * ) Notice: Subject to any disclaimer, the term of this patent is extended or adjusted under 35 U.S.C. 154(b) by 239 days.

(21) Appl. No.: 14/435,112

(22) PCT Filed: Oct. 10, 2013

(86) PCT No.: PCT/DE2013/000585
§ 371 (c)(1),
(2) Date: Jul. 15, 2015

(87) PCT Pub. No.: WO2014/056480
PCT Pub. Date: Apr. 17, 2014

(65) Prior Publication Data
US 2015/0308824 A1   Oct. 29, 2015

(30) Foreign Application Priority Data
Oct. 11, 2012 (DE) ................ 10 2012 020 246

(51) Int. Cl.
*G01C 15/00* (2006.01)
*G01S 3/782* (2006.01)
*G01S 7/497* (2006.01)

(52) U.S. Cl.
CPC ............ *G01C 15/006* (2013.01); *G01S 3/782* (2013.01); *G01S 7/4972* (2013.01)

(58) Field of Classification Search
CPC ................ G01J 1/44; H01J 40/14; H03F 3/08
See application file for complete search history.

(56) References Cited

U.S. PATENT DOCUMENTS

| | | | | |
|---|---|---|---|---|
| 4,674,870 A | * | 6/1987 | Cain ................... | G01C 15/004 356/141.3 |
| 7,323,673 B1 | * | 1/2008 | Ake ..................... | G01J 1/4228 250/214 R |
| 2001/0013929 A1 | * | 8/2001 | Torsten ................... | G01C 3/08 356/5.01 |
| 2010/0128247 A1 | * | 5/2010 | Heizmann ............... | G01S 7/484 356/5.01 |
| 2011/0221487 A1 | * | 9/2011 | Lesso .................... | H03L 7/087 327/147 |

OTHER PUBLICATIONS

International Search Report issued in PCT/DE2013/000585, dated Feb. 27, 2014, 4 pages.

* cited by examiner

*Primary Examiner* — Luke D Ratcliffe
(74) *Attorney, Agent, or Firm* — Polsinelli PC

(57) ABSTRACT

The invention relates to a receiving unit for light-based measurements/surveying using an analog-to-digital converter for the clocked analog-to-digital conversion of light detection signals and a clocking means for clocking the analog-to-digital converter. According to the invention, the clocking means has, for receiving modulated light signals, a phase-locked loop having an input for light detection signals modulated according to the light signal modulation and an output for outputting a frequency multiple of the detected modulation frequency for the analog-to-digital converter clocking.

26 Claims, 3 Drawing Sheets

LIGHT BEAM RECEIVER FOR RECEIVING UNMODULATED AND MODULATED LIGHT BEAMS

Figure 1:
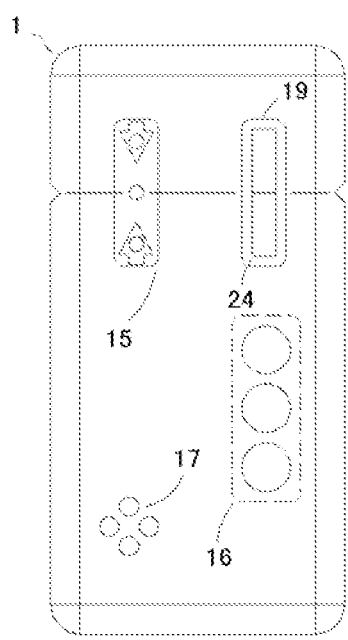

The present invention relates to the generally claimed subject-matter and is thus concerned with the receipt of light beams in surveying.

Where light beams are used for surveying, light beam receivers are required. A typical area of application is, for example, the receipt of light from rotating lasers and line lasers used at construction sites and the like. With these, laser light is projected, for example, in the form of rotating or otherwise moving laser beams having a punctiform cross section, as laser fan that may be static or moving, or as a laser plane, which can be fanned out by means of conical mirrors. Special light beam receivers are required for allowing the use of this radiation in surveying even at a large distance and under unfavorable conditions.

Light beam receivers are often designed as handheld receivers, sometimes also as machine-mounted receivers for attachment to the arms or shields of construction machines for remote display or for automatic control of the position of machining tools. The presently described light beam receivers can be used in this way.

With light beam receivers used in surveying it is possible to handle various measuring tasks.

This leads to different requirements for the laser light receivers. For example, when laser fans or laser planes are used, laser light is typically modulated. Demodulation at the receiver then makes it possible to carry out measurements even at a considerable distance from the laser source and thus at a significantly reduced signal intensity in spite of interfering factors such as sunlight, background noise etc.

If, for example, in a rotating laser, a punctiform laser beam rotates about an exactly perpendicular rotation axis, it is possible to exactly measure heights, i.e. more precisely, distances to a laser plane, with suitable light beam receivers. For this purpose, the light beam receiver uses, for example, a plurality of detectors together, from whose signal strengths at receipt of the laser beam it is possible to determine a height relative to the reference plane defined by the rotating laser beam, largely independently of its distance from the laser.

The detector elements used for this purpose are usually provided as quasilinear detector lines, as shown, for example, in U.S. Pat. No. 5,471,049, as light conductor-based PSD (position-sensitive detector), as disclosed in U.S. Pat. No. 7,110,092, or as multiple arrangement of many identical individual photodetector elements, the sensitivity of which is, however, electronically weighted differently on the basis of their height, cf. U.S. Pat. No. 6,873,413 or, in the simplest case, which are provided as two even-sized photoelectric elements arranged on top of each other.

When using suitable evaluation circuits, the photoelectric detectors described there are all more or less suitable for height resolution and/or local resolution laser reception. Reference is made to the corresponding disclosure for the purposes of the present invention; the documents are fully incorporated into the present invention for the purpose of disclosure.

To ensure a stable, highly accurate and noise-immune measurement, the prior art light beam receivers were designed either for receiving unmodulated, rotating laser beams or for receiving modulated, static laser fans. Both operating modes together cover the overwhelming majority of light beam receivers required for surveying for the rotation lasers or line lasers commonly found on the market.

However, respective specialized devices could not be used for the other operating mode; accordingly no combination devices are known which support both operating modes with a performance similar to that of high-quality light beam receivers optimized for a single operating mode.

Moreover, previous light beam receivers for receiving modulated light beams were only designed for a narrow modulation frequency range of the laser light source modulation because only with narrow detection bandwidths of the signal processing circuits is it possible to achieve suitable ranges. In this connection, the bandwidths of extremely selective receivers are below 10 Hz and the carrier frequencies of various line laser-using stationary models are typically between 4 and 12 kHz. Since different manufacturers have chosen extremely different modulation frequencies for their laser light sources, the associated light beam receivers are suitable for the devices of one manufacturer only, unless by chance other manufacturers have selected a similar modulation frequency which (just barely) falls within the tolerance range of the light beam receiver.

Low-cost light beam receivers having a broader bandwidth allow the receipt of a wider range of modulation frequencies and can thus be used for several manufacturers, but, for that reason they also necessarily only achieve smaller ranges at a given receiver sensitivity.

Another difficulty is that with the emergence of light beam receivers having a broader bandwidth for modulated light beams the manufacturers of line lasers have shifted from modulation with a high-precision, quartz-stabilized frequency to modulation of the line lasers having low-cost RC oscillators. However, these RC oscillators having very broad tolerances strongly drift at fluctuating temperature and battery voltage. Consequently, they can no longer be used for narrowband, and thus potentially more powerful, receivers.

To avoid such problems, U.S. Pat. No. 4,756,617, as well as U.S. Pat. No. 7,012,237 and U.S. Pat. No. 7,323,673 already suggested light, beam receivers with phase-locked loops (PLLs) and synchronous detectors and/or intermediate frequency steps (super-het). The latter allow the relatively simple adjustment of the center frequency, but are not able to detect a drifting modulation frequency between reception pauses and must therefore perform a signal search for re-capturing the center frequency, which reduces their reaction time to such an extent that it is hardly possible to find an acceptable compromise between search bandwidth and range.

The light beam receivers of U.S. Pat. No. 4,756,617 and U.S. Pat. No. 7,012,237, which potentially have larger capturing ranges to compensate a drift or tolerance of the modulation frequency without noticeably reducing the reaction time to light beam reception, in addition have a small dynamic range which is limited by the native resolution of the analog-digital converters connected downstream of the synchronous detector and potential DC offsets of the synchronous detector. To nevertheless increase the dynamic range it is necessary to adapt the signal amplification upstream of the detector to the respective received signal amplitude. A further disadvantage consists in the fact that the proposed synchronous analog peak detector achieves optimal detection only when the center frequency of the capturing range of the PLL is exactly met, but further away therefrom it can no longer accurately process the received carrier due to phase shifts of the captured frequency.

The center frequency of the capturing range of such structures must therefore be narrowed down in production by matching the components if the capturing range is to be kept narrow in order to achieve a high range of light beam reception. Thus, ultimately, a product results which is considerably more expensive than usual rotation laser receivers, which is again configured for a specific frequency only, and which allows hardly more than a capturing range of +/−10% around the preset center frequency.

Typical light beam receivers for rotating, unmodulated light beams sometimes considerably differ from the previously described approaches for modulated light beams since the signals of the detector elements in rotating, unmodulated light beams have both considerably higher bandwidths (from 250 kHz) and considerably higher signal amplitudes. In this connection it is noted that the light beam receiver which is periodically swept by the light beam, typically at a considerable distance, receives from central stations, i.e. light transmitters emitting rotating light beams, a beam which, although possibly somewhat broadened due to diffraction, has nevertheless a comparatively high power per unit area of the beam cross section. This high power per unit area will repeatedly reach the laser receiver depending on rotation; since, as a rule, rotation is achieved by a rotation of mechanical components, the repetition rates are comparatively low. In contrast, central stations emitting "modulated" light beams transmit them in the form of fans or broadly expanded lines. Here, the entire fan edge or the entire broadly expanded line is simultaneously illuminated. Thus, the entire laser power of the light transmitter is distributed over a rather large area and the power per area is correspondingly low. In contrast, modulation is not mechanically caused but by modulation of the laser power source. This is possible at high frequency, even if 100% modulation between "laser off" and "laser on maximum power" is used. Thus, light receivers which are intended to both detect pulsed light beams received from a rotation station and to use high-frequency modulated light from central stations emitting modulated light beams for measuring purposes, must be able to provide good results in two measuring regimes, namely, on the one hand, in the regime of high light power that is received in pulsed form but yet at low frequency, and, on the other hand, in the regime of light beams which are modulated at high frequency but only have a low power density. It is further noted that, as will be understood, also rotatingly emitted light beams may be high-frequency modulated, for example by variations in the pump stream of a laser diode emitting the light beams. With this kind of light transmitters, too, a high power density will be present due to the low beam diffraction and it will additionally be necessary to distinguish between the comparatively short times in which a light receiver is swept by the rotating beam and the waiting periods until the beam arrives again.

Thus, in the prior art it is only possible to realize combination receivers for both operating by providing analog signal processing twice or limiting the range and performance.

Thus, a high-performance combination receiver would be preferable. Therefore it is desirable to be able to provide a receiver for modulated light beams which with at most little adjustment can also be used for light beams which are received in pulsed form and which generally are also unmodulated.

It would be particularly preferable if the light beam receiver could be switched between the operating modes either manually by the user or automatically, in particular upon switching on, by the device.

It would also be preferable if the light beam receiver had a high performance in both modes, i.e., in particular, had a great degree of interference resistance and a large range.

It would also be preferable if the light beam receiver had hardware for both operating modes but could be limited to only one of the two operating modes by means of software, without being at a cost disadvantage compared to other approaches of the prior art, which compete with it on the market.

It would also be desirable if the light beam receiver in the operating modus for modulated light sources had the ability to teach in the modulation frequency, at least upon command of the user and/or automatically, this being preferably done in a wide frequency range.

It would also be preferable if an expensive matching of component values in production was redundant.

It would also be desirable if the light beam receiver at the edge of the capturing and/or search range was not affected by a reduction of the detected amplitude.

It is therefore preferable to be able to provide a receiver for modulated light beams which, with at most little adaptations, can also be used for unmodulated light beams which are received in pulsed form.

It is the object of the present invention to provide a light beam receiver which at least partially addresses at least some of the above-mentioned objects.

The solution of this object is claimed in independent form. Preferred embodiments are found in the dependent claims.

Proposed is thus a receiving unit for light-based measurements, such as surveying on construction sites, light barriers, distance or alignment measurements, etc., having an analog-to-digital converter for the clocked analog-to-digital conversion of light detection signals and a clocking means for clocking the data stream from the analog-to-digital converter; wherein for receiving modulated light signals, the clocking means has a phase-locked loop arrangement (PLL, phase locked loop) with an input for light detection signals modulated corresponding to the light signal modulation and with an output for outputting a frequency multiple of the detected modulation frequency for clocking the data stream of the analog-to-digital converter.

The clocking of the data stream of the analog-to-digital converter can be effected in various ways. On the one hand it is possible to change the clocking of the analog-to-digital converter per se. Depending on how high the modulation frequency of the received light is (in the regime with low power density but higher modulation frequency), the frequency with which the analog-to-digital converter carries out the conversion will be variable. A further possibility consists in having the analog-to-digital converter permanently convert analog signals into digital signals with a high converter frequency, and to then use only those data from the thus generated data stream for which this is required according to the clocking determined on the basis of the phase-locked loop. This also clocks the data stream. Using the clocking, it is then determined which data from the continuous data stream (higher-frequency data but not synchronous with the modulation of the light beam) are to be used.

The light detection signals modulated in accordance with the light signal modulation can be detected with one or more detectors. For example, in a case where the signal ratio of an upper and a lower light detector, which receive light together, is determined in order to derive therefrom a height, this can be done for example, by supplying the sum of the two detectors for determining the clock to the phase-locked loop. Moreover, the signals can be conditioned, i.e., for example, they can be amplified, impedance-matched, inverted and/or band-pass filtered, as required. It is possible, for example, to use a bandpass filter in order to detect the modulation signal even from a larger background. The bandpass filter can optionally be built with different filter widths, in order to allow first of all a wider detection around a center frequency and/or in order to adjust to different signal-to-noise ratios.

This arrangement enables a powerful reception of modulated signals independently of the exact modulation frequency without requiring an expensive matching of components, i.e. a switching arrangement of which considerable parts can be used for receiving rotating laser signals, and thus laser signals received on/off pulse. By adjusting the converter clocking or the data acquisition from the data stream of the analog-to-digital converter to the modulation frequency in a simple manner, a costly matching in the factory becomes dispensable. Furthermore, the adjustment of the clocking allows a simple averaging of the digitally converted signals and thus achieving a very good signal-to-noise ratio. Here it is of advantage that synchronisation of the starting point for storing the wave form in the memory with the modulation frequency by the inventive approach of using a clocking means having a phase-locked loop facilitates data averaging.

It is therefore particularly preferred that a light beam receiver of the invention for analyzing a received light beam with a light beam detector arrangement comprising at least one light beam detector element and an evaluation unit having at least one analog-to-digital converter is configured such that the analog-to-digital converter is clocked with an output clock of a PLL whose frequency is a multiple of a carrier frequency of a received modulated light beam falling within the capturing range of the PLL and that the resulting digital data stream at the output of the analog-to-digital converter is digitally detected for determining an amplitude. The amplitude measurement here becomes especially precise, in spite of the use of low-cost components.

Preferred is also a light beam receiver wherein the center frequency of the capturing range of the PLL can be controlled via a control signal, in particular by the, or an, evaluation unit.

In particular, it is thus possible to at least roughly pick up the modulation frequency close to the transmitter, i.e. at a position where the signal-to-noise ratio is of good quality, and to then use the detected center frequency for further measurements at larger distances. In particular, it is also possible to measure the frequency. The modulation frequency can, in particular, also be detected by means of a search run with which the frequency is checked at which the phase-locked loop locks in.

Here, drifting still occurring at the transmitter can readily and cost-effectively be compensated by a corresponding broad selection of bandpass filters, capturing ranges, etc. In case the light beam receiver, in particular the hand-held light beam receiver, of the invention is to be used with varying central stations having different modulation frequencies, it is possible to store the center frequency attributed to each respective central station. It may then be successively attempted, for example, during operation, to work with specific, previously detected center frequencies or to use one of a plurality of already stored frequencies based on user control. In particular, it is thus possible to measure the frequency at which the phase-locked loop locks in. It is noted that this may be helpful later to facilitate renewed synchronization to a previously captured central station, in particular in a case were a plurality of different central stations, possibly interfering with each other, are simultaneously operated.

Thus, a preferred light beam receiver can be provided which, in its operating mode for modulated light sources, has the ability to be taught-in the modulation frequency. This teaching-in may occur either on command of the user or automatically, preferably in a rather wide frequency range. The adjustment of the center frequency may also be controlled via software. It is noted that other teaching options also exist.

It is possible and preferred that a light beam receiver according to the present invention is designed such that an evaluation unit comprises a timer having an output for pulse width modulation which is synchronized via the output clock of the PLL. The center frequency of the capturing range of the PLL can be controlled by the pulse width modulated output signal of the timer. This is preferred. Furthermore, it is noted that it is possible to capture the current frequency to which the phase-locked loop locks in and to then adjust the center frequency. This is particularly advantageous in case of strong drifting of the light transmitter modulation.

It is clear that the light beam receiver of the present invention cannot only be used for receiving a modulated light beam but also for receiving unmodulated, in particular, rotating light beams, without that significant changes in the circuit are required.

The preferred light beam receiver of the present invention is thus a combination device for modulated light signals, in particular modulated light beams and/or light fans, and at the same time also for unmodulated light beams received in pulsed form. The light beam receiver of the present invention preferably allows switching between the two operating modes of—"modulated" and "unmodulated"—light beams and/or light signals. Preferably, the light beam receiver will be designed for teaching-in the center frequency of the capturing range and for the, at first, temporary storing of a center frequency taught-in and/or for execution of a search run.

Figure 2:
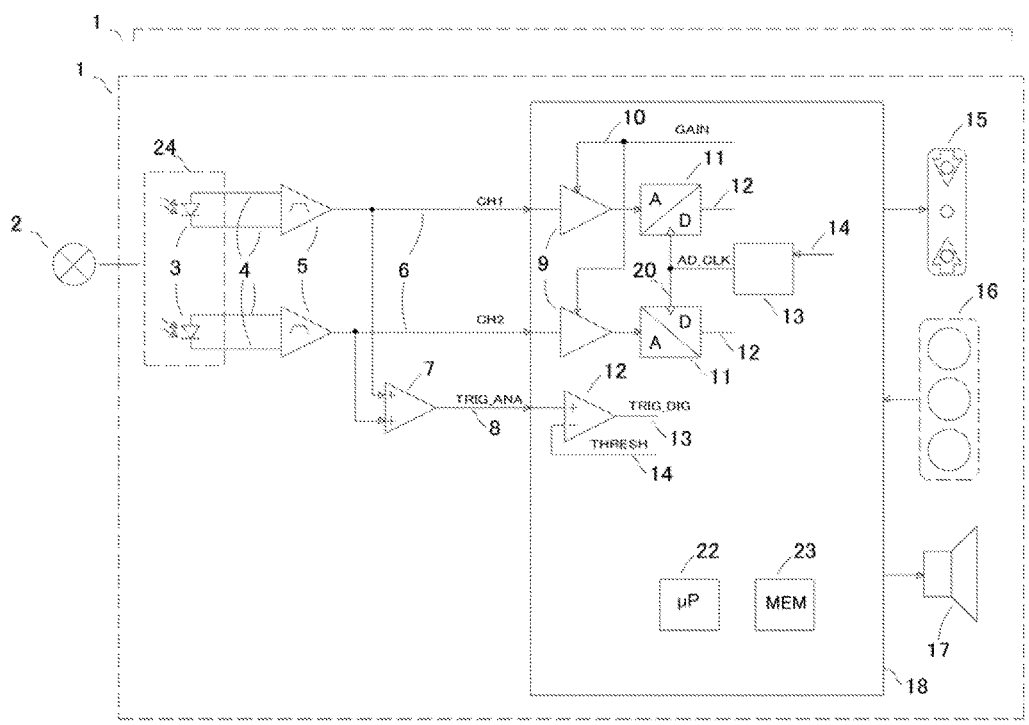
Figure 3:
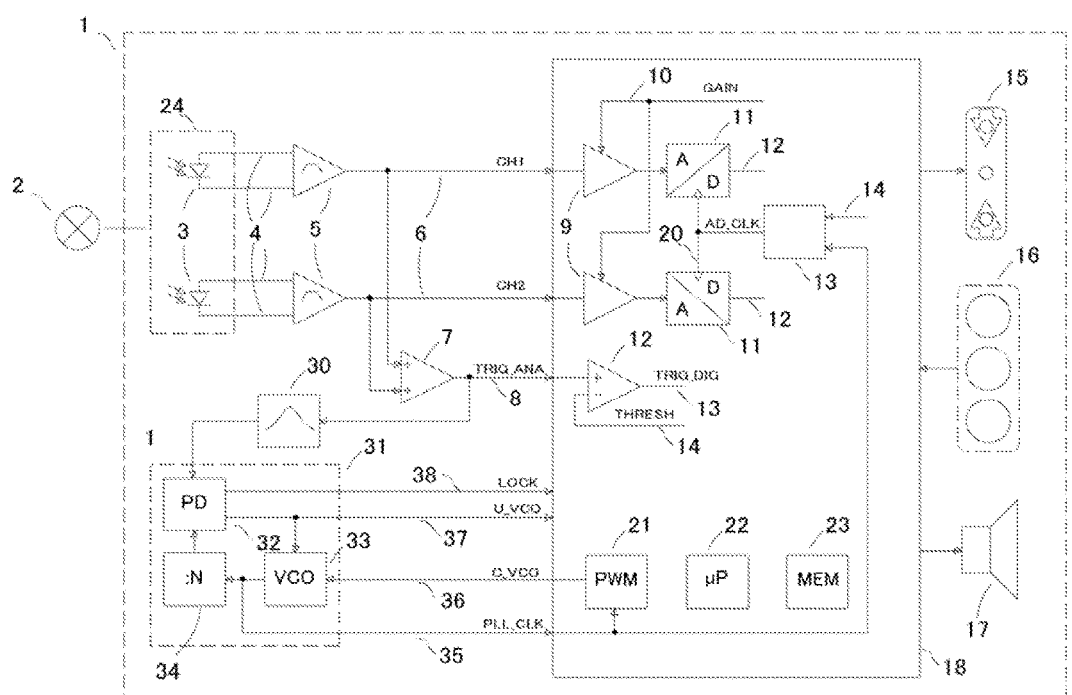

In the following, the invention will be described by way of example only on the basis of the drawing. The drawing shows in:

FIG. 1 a handheld receiver of the present invention;

FIG. 2 a previously known switching arrangement for a handheld receiver according to FIG. 1;

FIG. 3 the arrangement of FIG. 2 with the addition of a phase-locked loop influencing the analog-to-digital converter clock in accordance with the invention.

According to FIG. 1, a handheld receiver 1, generally designated as 1, for receiving pulsed and modulated light beams comprises two light-sensitive detector elements shown at 24, different actuation buttons 16, a loudspeaker 17 and a display 15 for displaying a current height relative to a reference height. Display 15 is to be controlled such that when a light beam falls within the center of the field 24 for the light-sensitive detector elements, a central LED is controlled "ON GRADE", i.e. by excitation of the LED it is displayed that—within tolerance limits—the correct height is given—and otherwise arrows are displayed indicating the deviation from the reference height.

To achieve this, the light beam receiver has two light-sensitive detector elements at 24 which upon receipt of a light beam generate electric output signals 4 which are further processed by the respective assigned amplification and signal conditioning steps 5. The output signals 6 of the amplification and signal conditioning steps 5 are supplied to an evaluation unit 18, see FIG. 2. The light beam receiver shown in FIG. 2 is used in the prior art only for receiving rotating light beams, i.e. pulsed light beams; for the purposes of the invention, an on/off pulse by beam rotation is not understood as modulation, to facilitate explanation. However, this does not change the fact that light beams received in pulsed form may also be emitted by a central station emitting modulated light and are detectable by the device of the invention irrespective of their then actually given higher frequency modulation.

FIG. 2 only shows those components that are required for use with unmodulated beams received in pulsed form.

From U.S. Pat. No. 7,394,427 is known a light beam receiver for receiving rotating light beams, which is equipped with at least one photoelectric element provided for receiving light beams and which outputs at least one electric signal which after signal conditioning and amplification is supplied to an A/D converter which generates a data stream from which the signal amplitude can be derived proportionally to the received light beam in order to conclude therefrom a particular property of the received light, e.g. its position on the detector element. The disclosure content of this document is integrated by reference.

Early implementations of this approach use a digital trigger based on the values of the digital data stream to control its import into a sample buffer (ring memory or ring buffer). However, this approach has the disadvantage that sampling must continue while waiting for the receipt of a beam, which sometimes requires considerable power uptake, in particular when it would be possible to change to an energy-saving mode during long pauses but no criterium exists for waking upon receipt of a light beam.

For this reason, more recent implementations use a trigger impulse which is generated by means of an analog comparator supplied with an analog threshold value and a further amplified and filtered sum of the electric signals for the A/D converter. Thus, it is possible to switch off the A/D converter and the amplifier steps with programmable amplification during long pauses, and to wake the evaluation circuit at any time upon receipt of a light beam. The evaluation circuit (here a microcontroller) anyhow usually comprises analog comparators so that therefore only minimal additional costs need to be expected.

FIG. 2 further shows that two programmable amplifiers 9 are provided upstream of the A/D converters 11 for the amplification of the signals 6 in the evaluation unit 18, whose amplification 10 is controllable by software. Here, two A/D converters are provided for the two light-sensitive detector elements, so that a dedicated A/D converter for each light-sensitive detector element is provided. (It is noted that this is not an indispensable requirement. Thus, a multiplexer could be provided upstream of an individual A/D converter, in order to successively convert the analog signals from different channels; the depicted embodiment, however, is considered to be more easily understandable). Here, the adjustable amplification 10—which already exists in the prior art—is only explicitly shown and mentioned because the evaluation unit is preferably a microcontroller and because its A/D converter sections are usually equipped with amplification steps with adjustable amplification and because they are advantageous for the extension in accordance with the particularly preferred embodiment of the presently disclosed invention. However, for receiving rotation laser light it is usually sufficient to program the amplification steps to an amplification of 1 or to switch them off. In such a case, the signals 9 directly reach the A/D converter inputs.

For enabling the recognition of an incoming light impulse of the rotating laser beam, a summing amplifier and signal conditioner 7 for signals 6 is provided, which further processes these signals and supplies an analog trigger signal 8 to a signal comparator included in the evaluation unit 18.

The signal comparator compares the analog trigger signal 8 with a threshold value voltage 14 which is either preset or programmable by software. The digital result of this comparison, the digital trigger signal 13, is now available for controlling the sampling process and the storage in the internal memory 23 of the evaluation unit. While the microprocessor 22 and the internal memory 23 are presented in the schematically shown evaluation unit 13 but are not connected in the drawing, it is clear that, of course, in the practical realization suitable signal and voltage supply lines etc. are routed to elements 22 and 23 in unit 18.

The internal memory 23 now comprises a ring memory in which the data of the data stream generated by the A/D converters are stored, while the evaluation unit waits for a light beam incident. In the process, the older values are successively overwritten.

In view of the Nyquist-theorem, the sampling rate 20 of the A/D converters 11 is chosen such that it is at least twice as fast as the maximum bandwidth of the signals 6. The length of the ring buffer is selected such that even very slow incidents received at short distances will be stored in the ring memory to the greatest possible extent.

The arrangement is designed for having the trigger signal 13 stop the writing to the ring buffer after a predefined time which is somewhat shorter than the time required for once writing full the ring buffer. It is thus possible to capture even transient responses prior to the occurrence of the trigger signal as well as the complete profile of the signals 6 during a light impulse.

From the behavior of the stored data, the evaluation unit can calculate digital values whose ratio corresponds to a large extent to the ratio of the signal amplitudes of the light beams received on the detector elements 3. Then the evaluation unit can derive therefrom the point of incidence on which the beam strikes the arrangement 24 of the detector elements so that the user can be provided with information on the height via the display 15, optionally also via loudspeaker, cf. 17.

The previously known handheld receiver is thus readily suitable for capturing pulsed, rotating light beams for measuring purposes, in particular for the purposes of measurement of heights.

It will now be shown how the arrangement depicted in FIG. 2 can be modified by simple means to also capture modulated signals. For this, FIG. 3 is referred to hereinafter. FIG. 3 includes many parts that are identical, and thus also functionally identical to the embodiment of FIG. 2, but also comprises the supplement according to the invention.

Again, also according to FIG. 3, a light beam receiver 1 for receiving rotating, unmodulated light beams comprises an arrangement 24 of two light-sensitive detector elements which upon receipt of the light beam generate electric output signals 4 which are further processed by two amplification and signal conditioning steps 5 each. The output signals 6 of the amplification and signal conditioning steps are supplied to the evaluation unit 18.

For further amplifying these signals 6, the evaluation unit 18 is provided with two programmable amplifiers 9 upstream of the A/D converters 11 whose amplification 10 can be adjusted via software. However, for receiving rotation laser light it is sufficient to program them to an amplification of 1 or to switch them off; in this case, the signals 9 arrive directly at the A/D converter inputs.

For recognizing an incoming light impulse of the rotating laser beam, the signals 6 are further processed in a summing amplifier and signal conditioner 7, and the analog trigger signal 8 is supplied to the signal comparator included in the evaluation unit 18. The signal comparator compares the analog trigger signal 8 with a threshold voltage 14 that is either preset or programmable via software. The digital result of this comparison, i.e. the digital trigger signal 13, is now available for controlling the sampling process and the storage in the internal memory 23.

While the evaluation unit waits for a light beam incident, the data from the data stream generated by the A/D converters are stored in one ring memory each, which is located in the internal memory 23, and older values are successively overwritten. The sampling rate 20 of the A/D converters is selected such that it is at least twice as fast as the maximum bandwidth of the signals 6. The length of the ring buffer is designed such that even very slow incidents (when received at shortdistances) will be stored in the ring memory to the greatest possible extent.

The trigger signal 13 stops the writing to the ring buffer after a predefined time which is set somewhat shorter than the time it takes to write full the ring buffer once. Thus, it is just possible to also capture transient responses prior to the occurrence of the trigger signal as well as the complete profile of the signals 6 during a light impulse.

From the behavior of the stored data, the evaluation unit can now calculate separate digital values, whose ratio corresponds to a large extent to the ratio of the signal amplitudes of the light beam received on the detector elements 3. On this basis, the evaluation unit can then conclude the point of incidence of the beam on the arrangement 24 of the detector elements and provide the user with height information via the display 15 or the loudspeaker 17.

Values which can be derived from the ring memory/ies are, for example, an integral value of the peak incident, its peak value or other values, such as peak width/amplitude, peak symmetry and temporal center of gravity. All these values can now be used for distinguishing wanted signals from interfering signals, for deriving further position information, such as angle and distances, from the time profile, etc.

According to the invention, further units are added for the operating mode with modulated light beam sources, such as line lasers. Here, there is first provided a high gain bandpass filter 30—which, however, is not absolutely required for the invention—fed by the analog trigger signal 8, the bandpass filter transmission area extending over at least one frequency range, namely the frequency range covering the expected modulation frequencies of the modulated laser transmitters 2 to be received. The bandpass filter is used to amplify the signal to such an extent that the downstream PLL 31 can still receive the trigger frequency even at large distances, but that, on the other hand, no overmodulation occurs due to extremely highly amplified background noise and other interfering signals.

The PLL 31 in turn comprises a phase detector 32, a voltage-controlled oscillator (VCO) 33 and a frequency divider 34 having a specific divider ratio.

However, the VCO 33 itself may also comprise a frequency divider.

How, if a sufficiently strong, modulated light beam falls on the detector elements, the PLL captures the carrier frequency and outputs a multiple thereof as output clock 35. If the carrier wave strong enough, this is indicated by a lock signal 38. The control voltage 37 of the VCO can likewise be passed on to the evaluation unit for adjusting the center frequency. The center frequency can be updated or adjusted by means of a control signal 36. Besides, it is per se possible, and furthermore also preferable, to measure the frequency during the lock-in state and to then adjust the center frequency.

For enabling detection of the signal amplitudes of the modulated signals, the A/D converters are clocked by means of the PLL output clock 35. Thus, this mode of operation uses a multiple of the modulation frequency as clock for the A/D conversions with the consequence that now, for each cycle of the modulation frequency, a specific number of values, e.g. four values, is detected in the digital data stream 12.

By massive averaging of the data of many cycles, the evaluation unit can now determine the signal amplitudes of the signals 6 at a resolution that corresponds to a multiple of the resolution of the A/D converters used. The additional increase in resolution is typically more than six bits so that when twelve-bit A/D converters are used, an effective resolution of the synchronous detector realized with them of more than eighteen bits is to be expected. Consequently, the digitally detected amplitude is only dominated by detector noise under normal conditions.

This must be seen as particular advantage of the presently presented digital and synchronous detection over the prior art, since with modulated line lasers it is now also possible to make highly accurate linear height measurements, as e.g. described in U.S. Pat. No. 7,110,092, due to the extremely high resolutions.

By modifying the amplification of amplification steps 9 upstream of the A/D converters with programmable amplification 10 it would be possible to even further enlarge the dynamic range. However, the adjustment for both operating modes may just be that for each operating mode a fixed amplification suitable for the respective operating mode is chosen.

In the case of an RC oscillator as VCO it is possible that, for example, through an added capacitance diode, the frequency-determining capacitance C is detuned by means of signal 36. Although this possibility exists, it is not particularly advantageous since it is relatively strongly dependent on temperature.

Therefore, a considerably better method of adjusting the center frequency of the PLL and the VCO should be mentioned which does not require significantly more circuitry. This more elegant method of adjusting the center frequency uses the PLL output clock 35 for synchronizing a PWM timer integrated into the evaluation unit, which via a PWM signal synchronized to the PLL output clock switches on and/or off a further capacitance in addition to the frequency-determining basic capacitance. The timer of the PWM here runs on a much higher clock than the PLL, if possible on the highest main clock available in the evaluation unit.

The timer is reset concomitant to the transitions of the PLL output clock 35 and thus synchronized to them.

The switching element can be a MOSFET switching to mass; in the simplest case it is a mass-related output driver of an output step of the output pin of the evaluation unit, running in open-drain operation, to which the PWM is switched.

Now, changing the sampling ratio of the synchronized PWM signal through adjustment of the digital PWM threshold, it becomes possible to highly accurately and digitally adjust the center frequency of the PLL or the VCO over a wide range.

If, as is typical, the evaluation unit already comprises a timer with open-drain or open-source PWM outputs, merely an additional capacitor is required for enabling the adjustment of the center frequency of the PLL.

Since it is now possible to adjust the center frequency of the PLL, in particular per software, the capturing range is no longer identical to the whole detectable frequency range, and can therefore be optimized independently of the latter.

The result is a receiving mode for modulated line lasers that can be used with a large number of different central stations because it can cover their modulation frequencies by teaching-in, while, at the same time, detecting with a bandwidth sufficiently narrow to achieve maximum measuring accuracy, ranges and immunity to noise. It is noted that the learning processes can be performed so quickly and unnoticeably that the user need not recognize them as such, leave alone has to prompt them.

Thus, with the simultaneously easily realizable functionalities for the operating mode with unmodulated, rotating light beams, such as with rotation lasers, a light receiver is achieved that is compatible with a large number of devices on the market, has very low production costs, and allows an ergonomic and exact operation in all operating modes.

Furthermore, the herein described light receiver concept is not limited to rotation lasers and modulation-exhibiting line lasers. It is also possible to receive slowly moving modulated light beam fans, such as occurring for example in motorized tachymeters, or slowly moving or static modulated target beams of point lasers to tachymeters, lasers for tunnel construction or lasers for channel construction. The receivers can also be used for many applications outside the construction sector, such as for light grids, light barriers, etc.

What is claimed is:

1. A light beam receiver for light-based measurements or surveying comprising:
    an analog-to-digital converter for clocked analog-to-digital conversion of analog light detection signals modulated in accordance with a light signal modulation having a modulation frequency, the analog-to-digital converter being adapted to the clocked analog-to-digital conversion with a clocking frequency being a multiple of at least twice the modulation frequency; and
    a clocking means for clocking a data stream from the analog-to-digital converter, wherein the clocking means comprises a phase-locked loop (PLL) having an input for receiving the analog light detection signals modulated in accordance with the light signal modulation, and having an output for outputting a frequency multiple of a detected modulation frequency for clocking the data stream of the analog-to-digital converter.

2. The light beam receiver of claim 1, further comprising:
    at least one light beam detector element; and
    an evaluation unit, wherein a digital data stream resulting at an output of the at least one analog-to-digital converter is digitally detected for determining an amplitude, and
    wherein the input of the PLL for receiving the analog light detection signals is modulated in accordance with the light signal modulation having a carrier frequency,
    the PLL having an output for clocking the data stream of the analog-to-digital converter and an output frequency that is a multiple of a carrier frequency of a received modulated light beam falling into a capturing range of the PLL.

3. The light beam receiver according to claim 2, wherein the evaluation unit provides a control signal to adjust a center frequency of the capturing range of the PLL.

4. The light beam receiver according to claim 3, comprising:
    a light beam detector having at least one light beam detector element; and
    the evaluation unit provides a control signal to adjust a center frequency of the capturing range of the PLL, and wherein the evaluation unit includes a timer having an output for pulse-width modulation, which is synchronized via an output clock of the PLL.

5. The light beam receiver according to claim 4, wherein the center frequency of the capturing range of the PLL is controlled by a pulse-width modulated output signal from the timer.

6. The light beam receiver according to claim 2, wherein for receiving an unmodulated, rotating light beam, the evaluation unit further comprises a comparator for comparing a conditioned light detection signal with a trigger threshold and for determining that a rotating light beam has been received if the conditioned light detection signal exceeds the trigger threshold.

7. The light beam receiver according to claim 6, wherein for receiving a modulated, non-rotating light beam, the evaluation unit further comprises an amplifier for conditioning the light detection signals.

8. The light beam receiver according to claim 2, wherein for receiving a modulated, non-rotating light beam, the evaluation unit further comprises an amplifier for conditioning the light detection signals.

9. The light beam receiver according to claim 1, wherein a center frequency of a capturing range of the PLL can be adjusted by means of a control signal from an evaluation unit.

10. The light beam receiver according to claim 9, wherein an evaluation unit includes a timer having an output for pulse-width modulation, which is synchronized via an output clock of the PLL.

11. The light beam receiver according to claim 10, wherein the center frequency of the capturing range of the PLL is controlled by a pulse-width modulated output signal from the timer.

12. The light beam receiver according to claim 1, wherein for receiving a modulated, non-rotating light beam, the light beam receiver further comprises an amplifier for conditioning the light detection signals.

13. A light beam receiver for light-based measurements or surveying, comprising:
    an analog-to-digital converter for clocked analog-to-digital conversion of light detection signals; and
    a clocking means for clocking a data stream from the analog-to-digital converter, wherein the clocking means comprises a phase-locked loop (PLL) having an input for receiving light detection signals modulated in accordance with a light signal modulation, and having an output for outputting a frequency multiple of a detected modulation frequency for clocking the data stream of the analog-to-digital converter, and
    wherein for receiving an unmodulated, rotating light beam, the light beam receiver further comprises a comparator for comparing a conditioned light detection signal with a trigger threshold and for determining that a rotating light beam has been received if the conditioned light detection signal exceeds the trigger threshold.

14. The light beam receiver according to claim 13, wherein for receiving a modulated, non-rotating light beam, the light beam receiver further comprises an amplifier for conditioning the light detection signals.

15. The light beam receiver according to claim 13, wherein for switching between an operating mode for modulated light beams and an operating mode for non-modulated light beams, the light beam receiver further comprises at least one gain stage having a selectable gain for conditioning the light detection signals by setting a gain for the modulated light beams to be higher than a gain for the non-modulated light beams.

16. The light beam receiver according to claim 15, wherein the PLL has a capturing range with a center frequency adjustable and wherein for manually or automatically teaching-in a modulation frequency of a light beam to be received, a PLL capturing range center frequency can be set by manually or automatically.

17. The light beam receiver according to claim 16, wherein a center frequency of the capturing range of the PLL can be continuously tracked while the PLL is locked.

18. The light beam receiver for analyzing a received light beam according to claim 13, further comprising:
    at least one light beam detector element; and
    an evaluation unit, wherein a digital data stream resulting at an output of the at least one analog-to-digital converter is digitally detected for determining an amplitude,
    wherein the input of the PLL for receiving light detection signals is modulated in accordance with a light signal modulation having a carrier frequency,
    the PLL having an output for clocking the data stream of the analog-to-digital converter and an output frequency that is a multiple of a carrier frequency of a received modulated light beam falling into a capturing range of the PLL.

19. The light beam receiver according to claim 18, wherein a center frequency of the capturing range of the PLL can be continuously tracked while the PLL is locked.

20. A light beam receiver for light-based measurements or surveying, comprising:
    an analog-to-digital converter for clocked analog-to-digital conversion of light detection signals; and
    a clocking means for clocking a data stream from the analog-to-digital converter, wherein the clocking means comprises a phase-locked loop (PLL) having an input for receiving light detection signals modulated in accordance with a light signal modulation, and having an output for outputting a frequency multiple of a detected modulation frequency for clocking the data stream of the analog-to-digital converter, and
    wherein for switching between an operating mode for modulated light beams and an operating mode for non-modulated light beams, the light beam receiver further comprises at least one gain stage having a selectable gain for conditioning the light detection signals by setting a gain for the modulated light beams to be higher than a gain for the non-modulated light beams.

21. The light beam receiver according to claim 20, further comprising:
    at least one light beam detector element; and
    an evaluation unit, wherein a digital data stream resulting at an output of the at least one analog-to-digital converter is digitally detected for determining an amplitude,
    wherein the input of the PLL for receiving light detection signals is modulated in accordance with a light signal modulation having a carrier frequency,
    the PLL having an output for clocking the data stream of the analog-to-digital converter and an output frequency that is a multiple of a carrier frequency of a received modulated light beam falling into a capturing range of the PLL.

22. A light beam receiver for light-based measurements or surveying comprising:
    an analog-to-digital converter for clocked analog-to-digital conversion of light detection signals; and
    a clocking means for clocking a data stream from the analog-to-digital converter, wherein the clocking means comprises a phase-locked loop (PLL) having an input for receiving light detection signals modulated in accordance with a light signal modulation, and having an output for outputting a frequency multiple of a detected modulation frequency for clocking the data stream of the analog-to-digital converter, and
    wherein the PLL has a capturing range with an adjustable center frequency, and wherein for manually or automatically teaching-in a modulation frequency of a light beam to be received, a PLL capturing range center frequency can be set manually or automatically.

23. The light beam receiver according to claim 22, wherein the center frequency of the capturing range can be continuously tracked while the PLL is locked.

24. The light beam receiver according to claim 22 further comprising:
    at least one light beam detector element; and
    an evaluation unit, wherein a digital data stream resulting at an output of the at least one analog-to-digital converter is digitally detected for determining an amplitude,
    wherein the input of the PLL for receiving light detection signals is modulated in accordance with a light signal modulation having a carrier frequency,
    the PLL having an output for clocking the data stream of the analog-to-digital converter and an output frequency that is a multiple of a carrier frequency of a received modulated light beam falling into a capturing range of the PLL.

25. The light beam receiver according to claim 24, wherein the center frequency of the capturing range can be continuously tracked while the PLL is locked.

26. The light beam receiver according to claim 22, comprising an evaluation unit that provides a control signal to adjust a center frequency of the capturing range of the PLL, wherein the evaluation unit includes a timer having an output for pulse-width modulation, which is synchronized via an output clock of the PLL.

* * * * *